(12) United States Patent
Choi et al.

(10) Patent No.: US 7,958,253 B2
(45) Date of Patent: Jun. 7, 2011

(54) METHOD AND APPARATUS FOR TRANSMITTING AND RECEIVING CONTENT ON DISTRIBUTED STORAGE SYSTEM

(75) Inventors: Sang-hoon Choi, Seoul (KR); Joon-ho Cho, Suwon-si (KR); Hyun-sik Yoon, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 418 days.

(21) Appl. No.: 11/634,878

(22) Filed: Dec. 7, 2006

(65) Prior Publication Data

US 2007/0136315 A1 Jun. 14, 2007

(30) Foreign Application Priority Data

Dec. 7, 2005 (KR) ........................ 10-2005-0118669

(51) Int. Cl.
*G06F 15/173* (2006.01)
(52) U.S. Cl. ........................................ 709/231; 714/748
(58) Field of Classification Search .................. 709/231, 709/201; 714/18, 748
See application file for complete search history.

(56) References Cited

U.S. PATENT DOCUMENTS

| | | | | |
|---|---|---|---|---|
| 4,630,108 | A * | 12/1986 | Gomersall | 725/34 |
| 5,313,612 | A * | 5/1994 | Satoh et al. | 711/162 |
| 5,574,861 | A * | 11/1996 | Lorvig et al. | 709/226 |
| 5,757,922 | A * | 5/1998 | Shiroshita | 380/42 |
| 5,768,528 | A * | 6/1998 | Stumm | 709/231 |
| 5,928,331 | A | 7/1999 | Bushmitch | |
| 6,154,744 | A * | 11/2000 | Kenner et al. | 707/10 |
| 6,526,323 | B1 * | 2/2003 | Miyajima et al. | 700/9 |
| 6,728,254 | B1 * | 4/2004 | Stacey et al. | 370/413 |
| 6,799,221 | B1 * | 9/2004 | Kenner et al. | 709/245 |
| 6,895,196 | B2 * | 5/2005 | Uchizono et al. | 399/75 |
| 7,287,062 | B2 * | 10/2007 | Im et al. | 709/213 |
| 7,295,543 | B2 | 11/2007 | Kikuchi et al. | |
| 7,386,757 | B2 * | 6/2008 | Lindenstruth et al. | 714/6 |

(Continued)

FOREIGN PATENT DOCUMENTS

CN 1216422 A 5/1999

(Continued)

OTHER PUBLICATIONS

Communication issued Sep. 26, 2010 by State Intellectual Property Office of P.R. China in counterpart Chinese Application No. 200610164517.X.

*Primary Examiner* — David Y Eng
(74) *Attorney, Agent, or Firm* — Sughrue Mion, PLLC (57) ABSTRACT

A method and apparatus are provided for transmitting and receiving a stream of content in a distributed storage system. According to the method, a stream of a copy of content is received from a plurality of storages being distributed in a network, wherein an original of the content is stored in a server and archival fragments of the copy of the content are separately stored in the storages, and a stream of the original content is selectively received according to the quality of the copy of the content, wherein the quality is determined based on the number of archival fragments received from the storages. Accordingly, it is possible to prevent degradation in the quality and reliability of content when archival fragments of a copy of the content are received from a distributed storage, thereby stably receiving a high-quality content streaming service.

16 Claims, 8 Drawing Sheets

U.S. PATENT DOCUMENTS

| | | | | |
|---|---|---|---|---|
| 7,444,421 B2 * | 10/2008 | Katayama | | 709/232 |
| 7,447,757 B2 * | 11/2008 | Muto | | 709/223 |
| 7,834,904 B2 * | 11/2010 | Brookins | | 348/143 |
| 2002/0156842 A1 | 10/2002 | Signes et al. | | |
| 2005/0188403 A1 | 8/2005 | Kotzin | | |

FOREIGN PATENT DOCUMENTS

| | | |
|---|---|---|
| CN | 1264476 A | 8/2000 |
| CN | 1601993 A | 3/2005 |
| WO | 98/58315 A1 | 12/1998 |

* cited by examiner

METHOD AND APPARATUS FOR TRANSMITTING AND RECEIVING CONTENT ON DISTRIBUTED STORAGE SYSTEM

CROSS-REFERENCE TO RELATED PATENT APPLICATIONS

This application claims the priority of Korean Patent Application No. 10-2005-118669, filed on Dec. 7, 2005, in the Korean Intellectual Property Office, the disclosure of which is incorporated herein in its entirety by reference.

BACKGROUND OF THE INVENTION

1. Field of the Invention

Methods and apparatuses consistent with the present invention relate to transmitting and receiving a content stream, and more particularly, to transmitting and receiving content in a distributed storage system.

2. Description of the Related Art

The aim of a distributed storage technique is to bind a plurality of storages distributed in a network together and use the binding result as large logical storage. The distributed storage technique may be used for storage extension of a media server in a home and to increase the accessibility and availability of content in the home. The media server in the home provides users with content but it is difficult for users outside the home to access the media server. The distributed storage technique has been introduced to solve this problem. That is, if a user backs up content stored in the media server in a distributed storage, the user can acquire the content from the distributed storage even when the user is located outside the home or when the media server is powered off.

An example of related art, distributed storage techniques is a distributed hash table (DHT). DHT is a distributed storage technique technology to which a distributed hash mechanism is applied, whereby a user who knows a hash value can store data in and acquire data from a distributed storage as conveniently as in a local storage space. In particular, if the user stores data via a UNIX file system Application Program Interface (API), the data is divided into fragments and the fragments are evenly placed in storages, which constitute a distributed storage, according to DHT. If the user requests the data via the API, DHT allows the fragments to be located and combined into a piece of data according to a routing mechanism in the distributed storage.

Examples of DHT APIs include Get(key) for obtaining data using a hash key from a DHT, Put(key, value) for storing the hash key and the data in the DHT, Destroy(key) for deleting the hash key and the data from the DHT, Update(key, value) for updating the hash key and the data, Join(node) for joining a DHT distributed storage, and Leave(node) for leaving the DHT distributed storage. Examples of representative DHT-based distributed storage techniques are Tapestry, Chord, OceanStore, CAN, etc.

Figure 1:
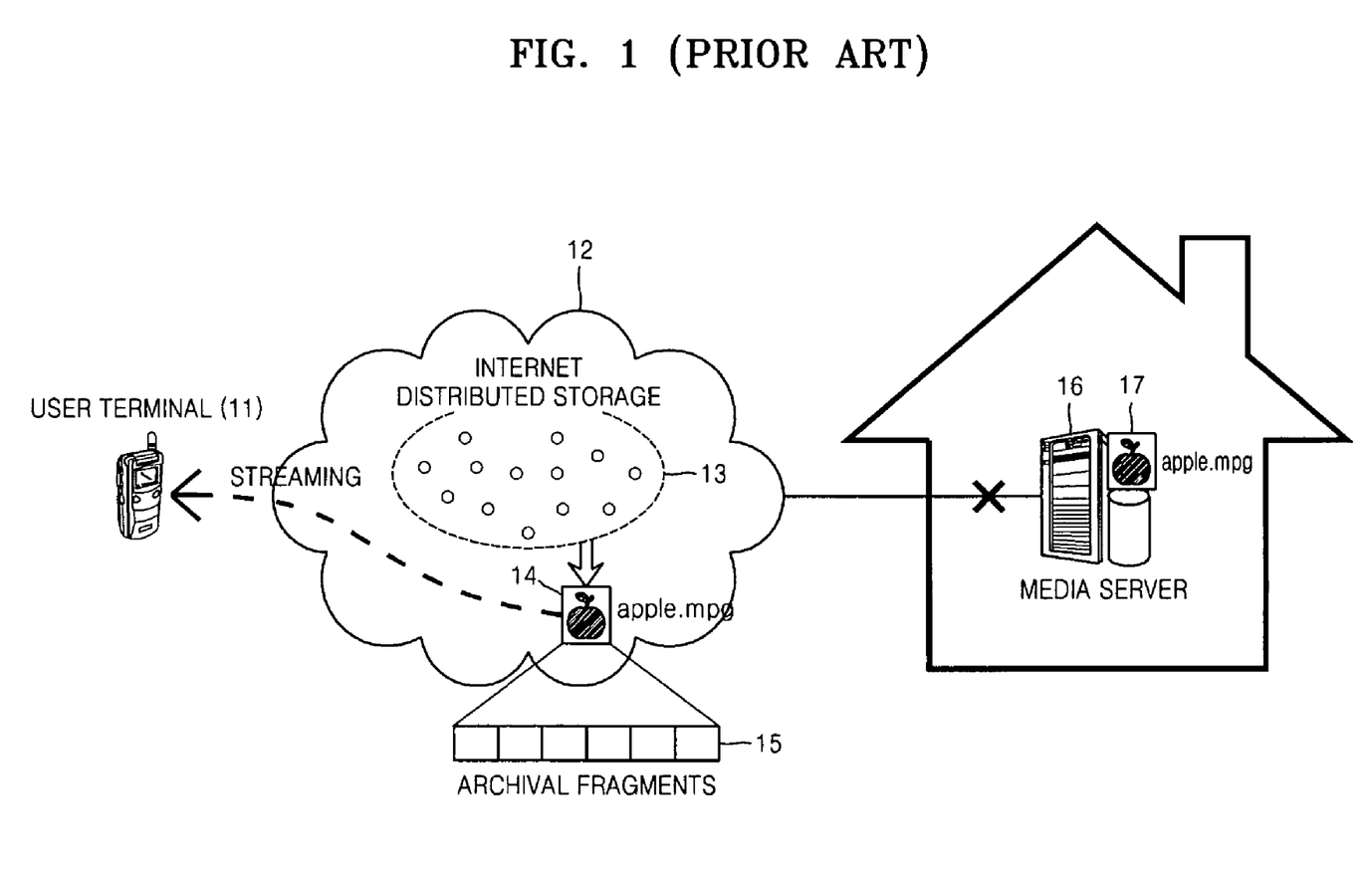
FIG. 1 is a diagram of a related art distributed storage system.

FIG. 1 is a diagram illustrating a related art, distributed storage system. Referring to FIG. 1, the system includes a user terminal 11, a distributed storage 13, and a media server 16.

The distributed storage 13 is comprised of a plurality of storages distributed in the Internet 12. The distributed storage 13 stores a copy 14 of content. Specifically, the copy 14 is stored in the storages constituting the distributed storage 13 in units of archival fragments 15. The locations of the archival fragments 15 of the copy 14 in the storages are determined according to the mechanism in the distributed storage 13.

Referring to FIG. 1, when the media server 16 is powered off, the user terminal 11 inside or outside a home can receive a copy 14 of the content from the distributed storage 13. Here, the copy 14 that the user terminal 11 receives is a sum of the archival fragments 15 stored in the corresponding storages of the distributed storage 13. That is, a piece of content is divided into several fragments and the fragments are separately stored in a plurality of locations, thereby increasing the overall usability of the distributed storage system, and the accessibility, usability, security and robustness of the content.

However, according to the related art distributed storage technique, the quality of content streaming is not uniform, since archival fragments of content are separately stored in a plurality of storages and the total number of storages available varies according to the content streaming state. That is, since nodes can freely join or leave a network in a distributed storage system, archival fragments placed in some nodes are probably not obtained regardless of a user's intention. That is, the related art, distributed storage technique cannot guarantee a stable content streaming service or the QoS (Quality of Service) thereof.

Further, few storages are available in the event of content streaming. Even available storages may perform many operations together with content streaming and thus limit resources for content streaming. In this case, a user receives a very low-quality content streaming service, and thus, the reliability of the content streaming service using a distributed storage is lowered.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides a content transmitting and receiving apparatus and method that provides a solution to a problem that the quality and reliability of content are lowered when achieving archival fragments of a copy of content from a distributed storage, and guarantees a stable high-quality content streaming service.

The present invention also provides a computer readable medium having embodied thereon a computer program for executing the method.

According to an aspect of the present invention, there is provided a method of receiving a stream of content, the method comprising receiving a stream of a copy of content from a plurality of storages distributed in a network, and selectively receiving a stream of the original content according to the quality of the received stream of the copy.

According to another aspect of the present invention, there is provided an apparatus for receiving a stream of content, the apparatus comprising a receiver which receives a stream of a copy of content from a plurality of storages distributed in a network; and a first requesting unit selectively which requests a stream of the original content according to the quality of the received stream of the copy, wherein the receiver receives the stream of the original content provided in response to the request from the first requesting unit.

According to another aspect of the present invention, there is provided a computer readable medium having embodied thereon a computer program for the method of receiving a content stream.

According to another aspect of the present invention, there is provided a method of transmitting content, the method comprising transmitting content to a plurality of storages distributed in a network, and selectively transmitting the content to a terminal acquiring a copy of the content from the storages, in response to a request from the terminal.

According to another aspect of the present invention, there is provided an apparatus for transmitting content, the apparatus comprising a transmitter which transmits content to a plurality of storages being distributed in a network; and a determination unit which determines whether an external message is a first message in which a terminal, having acquired a copy of the content from the storages, requests the original content, wherein the transmitter selectively transmits the content to the terminal when the external message is determined to be the first message.

According to another aspect of the present invention, there is provided a computer readable medium having embodied thereon a computer program for executing the method of transmitting content.

BRIEF DESCRIPTION OF THE DRAWINGS

The above and other aspects of the present invention will become more apparent by describing in detail exemplary embodiments thereof with reference to the attached drawings in which.

DETAILED DESCRIPTION OF EXEMPLARY EMBODIMENT OF THE INVENTION

Hereinafter, exemplary embodiments of the present invention will be described in detail with reference to the accompanying drawings. Like reference numerals denote like elements throughout the drawings.

Figure 2:
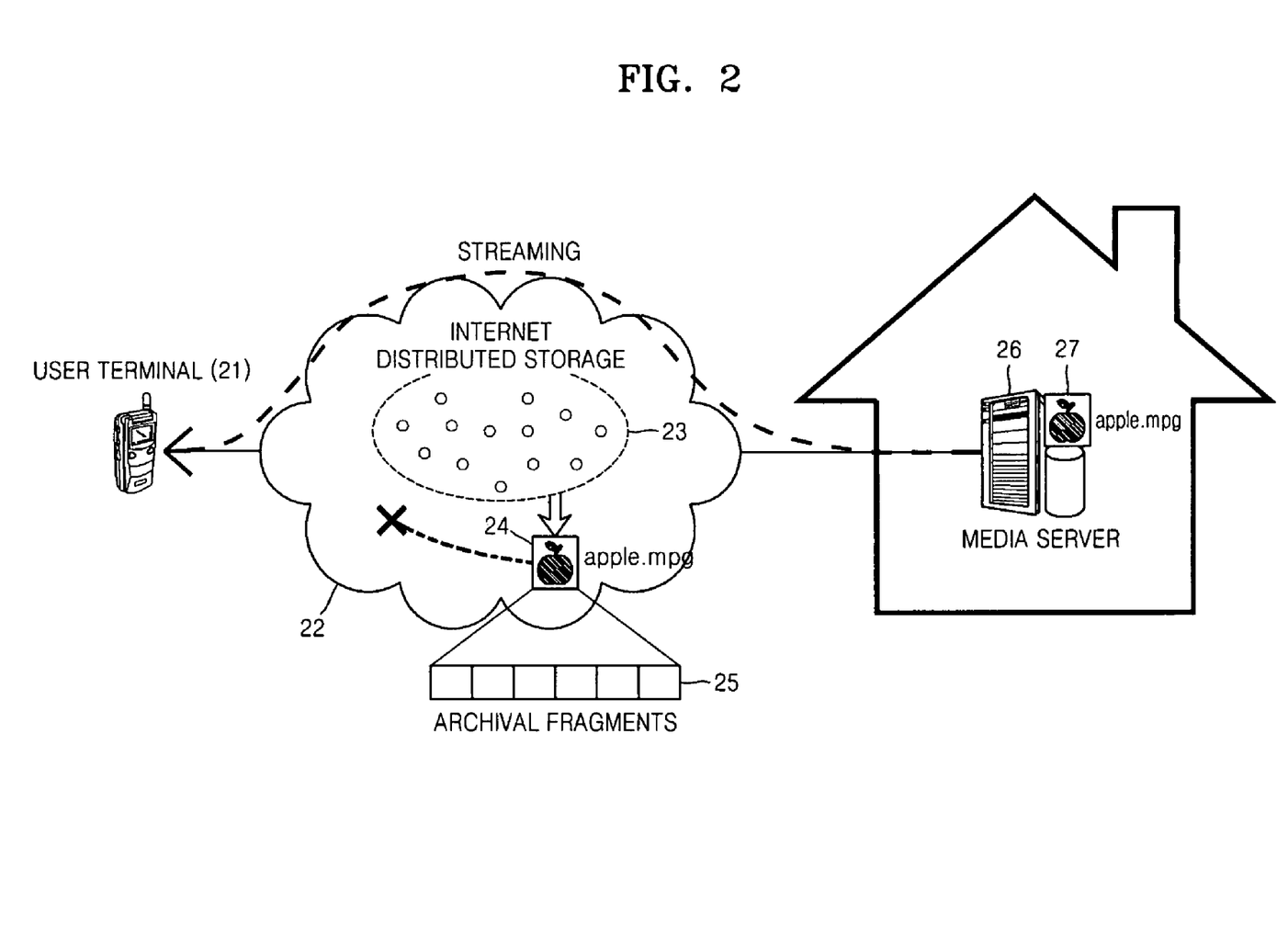
FIG. 2 is a diagram of a distributed storage system according to an exemplary embodiment of the present invention.

FIG. 2 is a diagram of a distributed storage system according to an exemplary embodiment of the present invention. Referring to FIG. 2, the distributed storage system includes a user terminal 21, the Internet 22, a distributed storage 23, and a media server 26.

The user terminal 21 receives a stream of a content copy 24 from a distributed storage 23 that includes a plurality of storages distributed in the Internet 22, performs rendering on the received stream, and transmits the rendering result to a user. If the streaming quality of the content copy 24 is very low, for example, when the number of available storages of the distributed storage 23 is low, a source of content streaming (the content copy 24) is replaced with the original content 27 as follows.

Specifically, when the streaming quality of the content copy 24 is lower than a predetermined level, the user terminal 21 powers on the media server 26 and sends the media server 26 a request for a stream of the original content 27. The user terminal 21 receives the stream of the original content 27 from the media server 26 as a response to the request, performs rendering on the stream of the original content 27, and transmits the rendering result to the user. In this way, it is possible to prevent the quality and reliability of the content from being lowered when the user terminal 21 receives a copy of the original content in the form of archival fragments from the distributed storage 23, and stably provide a high-quality content streaming service.

The content that the user desires to obtain is stored as the content copy 24 in the distributed storage 23 and as the original content 27 in the media server 26. A method of obtaining the content copy 24 from the distributed storage 23 is advantageous in that the accessibility and usability of the content are high, but the quality of content streaming is not uniform and the reliability thereof is low. A method of obtaining the original content 27 from the media server 26 is advantageous in that the quality of content streaming is uniform and the reliability thereof is high, but the accessibility and usability of the content are low. Therefore, the current exemplary embodiment and the following exemplary embodiments of the present invention employ the advantages of the above two methods.

Figure 3:
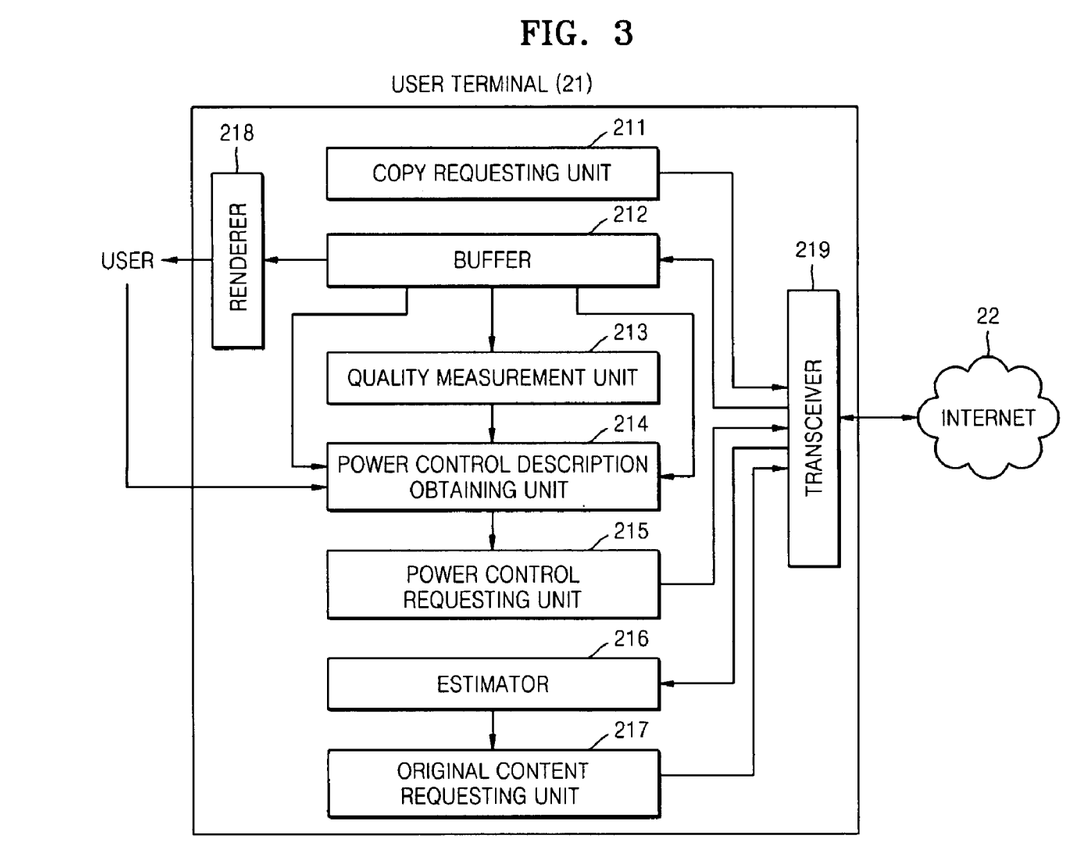
FIG. 3 is a block diagram of an apparatus for receiving a content stream according to an exemplary embodiment of the present invention.

FIG. 3 is a block diagram of an apparatus for receiving a content stream according to an exemplary embodiment of the present invention. Referring to FIG. 3, the apparatus is built in a user terminal 21, and includes a copy requesting unit 211, a buffer 212, a quality measurement unit 213, a power control description obtaining unit 214, a power control requesting unit 215, an estimator 216, an original content requesting unit 217, a renderer 218, and a transceiver 219.

The copy requesting unit 211 sends a request for the content copy 24 to the distributed storage 23. Specifically, the copy requesting unit 211 generates a message requesting nodes of storages of a distributed storage 23 to respectively transmit archival fragments of the content copy 24, and transmits the message to the transceiver 219.

The buffer 212 buffers a stream of the content copy 24 and a stream of the original content 27 supplied to the transceiver 219 so as to compensate for the difference between the speed of receiving content by the transceiver 219 and the speed of rendering performed by the renderer 218.

The quality measurement unit 213 measures the quality of the stream of the content copy 24 buffered in the buffer 212. In detail, the quality measurement unit 213 measures the number of lost archival fragments and the number of archival fragments received per unit time to evaluate the streaming quality of the content copy 24. It would be apparent to those of ordinary skill in the art that a method of evaluating the streaming quality of the content copy 24 is not limited.

When the streaming quality of the content copy 24 measured by the quality measurement unit 213 is lower than a predetermined level, the power control description obtaining unit 214 extracts a power control description 281 describing particulars needed to control power in the media server 26 from meta data contained in the content copy 24. More specifically, the power control description obtaining unit 214 acquires the power control description 281 of FIG. 4 in response to a request for replacement of a content streaming source (the content copy 24) with the original content 27, the request being received from a user who recognizes that the streaming quality of the content copy 24 measured by the quality measurement unit 213 is lower than a predetermined level. Alternatively, even if the power control description obtaining unit 214 does not receive the request for replacement of the content copy 24 with the original content 27, it may acquire the power control description 281 when the streaming quality of the content copy 24 measured by the quality measurement unit 213 is lower than the predetermined level.

The power control description 281 specifies a power control service for the media server 26 that the home gateway 29 (this is on FIG. 5 but there has been no reference to FIG. 5 yet) provides, and can be written in a format determined according to the type of power control service or a protocol of the power control service. In general, a power control service may be a web service, and thus use a HyperText Transfer Protocol (HTTP) for the web service. The power control description 281 describes the address of the home gateway 29 that provides the power control service for the media server 26, identification information of the media server 26, command code for controlling the power in the media server 26, etc.

Figure 4:
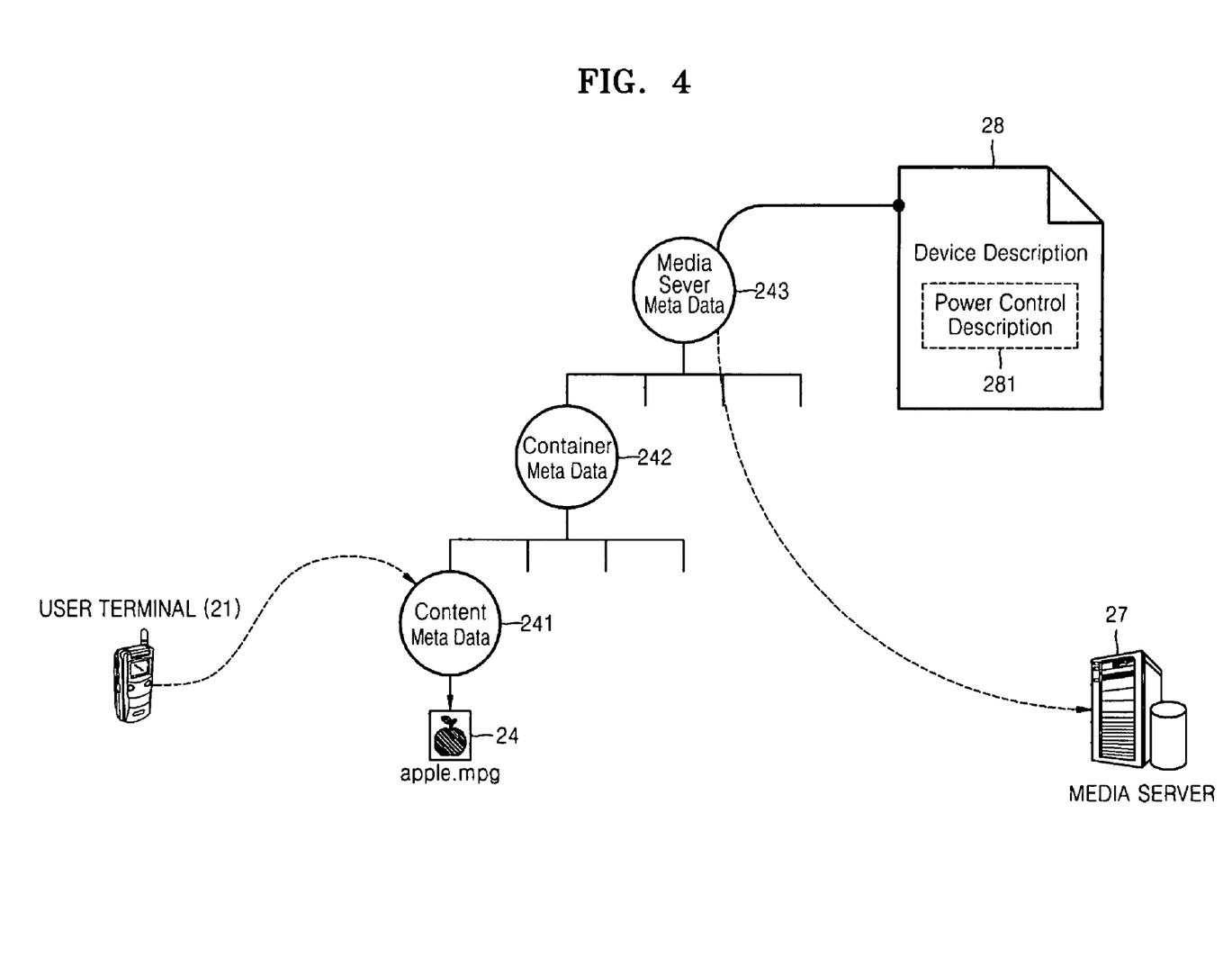
FIG. 4 is a diagram illustrating a method of obtaining a power control description according to an exemplary embodiment of the present invention.

FIG. 4 is a diagram illustrating a process of obtaining a power control description according to an exemplary embodiment of the present invention. Referring to FIG. 4, the power control description obtaining unit 214 extracts content meta data 241 from a content copy 24 of content by parsing archival fragments of the content copy 24 which are received from nodes of storages constituting the distributed storage 23. Next, the power control description obtaining unit 214 extracts container meta data 242 from the content meta data 241. Next, the power control description obtaining unit 214 extracts media server meta data 243 from the container meta data 242.

The media server meta data 243 contains a device description 28 regarding the media server 26. In general, the device description 28 contains information regarding a device, i.e., the media server 26. In particular, the device description 28 according to an exemplary embodiment of the present invention contains a power control description 281 that specifies particulars needed to control power in the media server 26. Thus, the power control description 281 is not mapped to the content copy 24 one to one but is mapped to the media server meta data 243 one to one. However, it would be apparent to those of ordinary skill in the art that the power control description 281 may be contained in the media server meta data 243, not in the device description 28.

In general, DHT-based distributed storage techniques support a hierarchical structure of a power control description 281 illustrated in FIG. 4, and therefore, the power control description obtaining unit 214 can obtain the power control description 281 in a hierarchical manner as described above.

If the streaming quality of the content copy 24 measured by the quality measurement unit 213 is lower than a predetermined level, the power control requesting unit 215 requests the media server 26 storing the original content 27 to be powered on. More specifically, the power control requesting unit 215 generates a power control message that requests the media server 26 to be powered up, based on the power control description 281 obtained by the power control description obtaining unit 214, and supplies the power control message to the transceiver 219. As described above, since the power control description 281 describes a power control service of the media server 26, which is provided by the home gateway 29, the power control message may be realized by an Application Program Interface (API) of the service provided by the home gateway 29.

Figure 5:
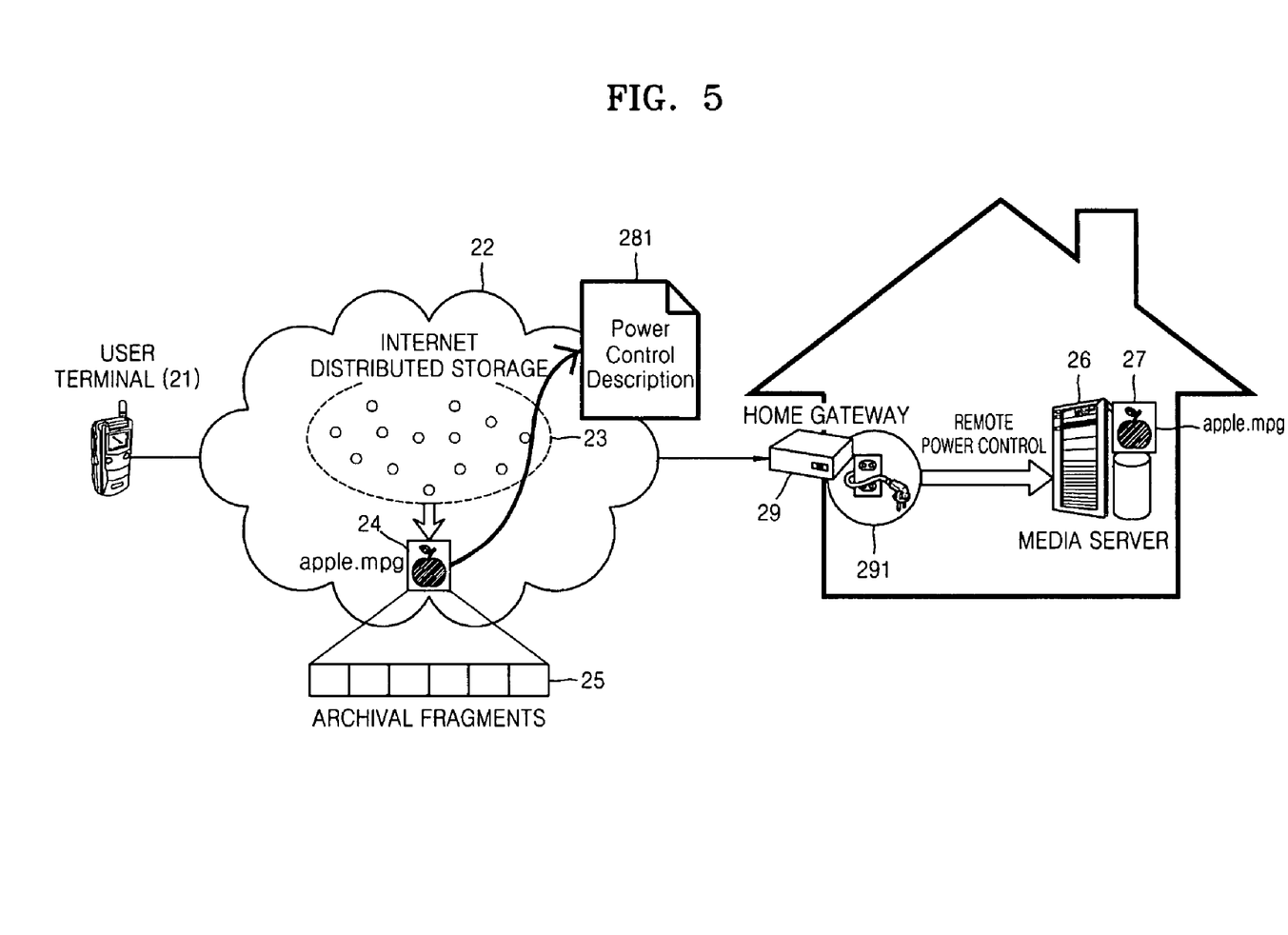
FIG. 5 is a diagram illustrating a process of controlling power in a media server by using a power control description according to an exemplary embodiment of the present invention.

FIG. 5 is a diagram illustrating a process of controlling power in the media server 26 by using the power control description 281, according to an exemplary embodiment of the present invention. Referring to FIG. 5, the user terminal 21 acquires the power control description 28 contained in the content copy 24 from the distributed storage 23, and controls power in the media server 26 at a remote site by using the power control description 28. In detail, the user terminal 21 records the address of the home gateway 29 in a destination address field of a header of a power control message, based on the power control description 281, and records identification information of the media server 26 and command code for requesting powering on the media server 26 in a payload of the power control message.

Upon receiving the power control message requesting powering on the media server 26 from the user terminal 21, a power control point 291 in the home gateway 29 recognizes that the power control message received from the user terminal 21 contains a request to power on the media server 26, based on the identification information of the media server 26 and the command code for requesting powering on the media server 26 which are recorded in the payload of the power control message, and transmits a power driving message instructing the media server 26 to be powered on to the media server 26.

According to a general home device power control technique, the home gateway 29 remotely controls power in a device entering a standby mode to receive a power control command from the home gateway 29, not a device that is powered off. That is, a constituent element of the media server 26, that controls the power in the media server 26, is always maintained in an active mode, and operates the other constituent elements of the media server 26 in response to the power control command from the home gateway 29. A representative home device power control technique uses a magic packet in a local area network (LAN). That is, the magic packet may be used as the power driving message.

Next, when it is determined that the media server 26 is powered on, the power control point 291 transmits a power control response message indicating that the media server 26 is powered on to the user terminal 21. In particular, the power control response message records the time when the power control response message is transmitted.

The estimator 216 estimates a location where the content copy 24 is to be replaced with the original content 27 in consideration of the communication environment between the user terminal 21 and the media server 26, that is powered on in response to a request from the power control requesting unit 215. In detail, the estimator 216 computes an instant of time when the original content 27 arrives based on times when the power control response is transmitted and received, specified in the power control response message received from the transceiver 219, and estimates the location where the content copy 24 is replaced with the original content 27 based on the computed time. The difference between the times when the power control response is transmitted and received is almost the same as a length of time needed for a stream of the original content 27 to be transmitted to the user terminal 21 from the media server 26.

The original content requesting unit 217 selectively requests streaming of the original content 27 according to the streaming quality of the content copy 24 received by the transceiver 219. In detail, in response to the request from the power control requesting unit 215, the original content requesting unit 217 sends the active media server 26 a request for a stream of the original content 27 starting from the location estimated by the estimator 216. That is, the original content requesting unit 217 generates a message requesting the media server 26 to transmit the original content 27 stored in the media server 26, and supplies the message to the transceiver 219.

The renderer 218 performs rendering on the stream of the content copy 24 or the original content 27 supplied to the transceiver 219, and supplies the rendering result to the user. In particular, the renderer 218 performs rendering on the stream of the content copy 24 supplied to the transceiver 219 before the location is estimated by the estimator 216, and the stream of the original content 27 supplied to the transceiver 219 after the location is estimated. As described above, until the media server 26 is powered on and the stream of the original content 27 can be received from the media server 26, the stream of the content copy 24 is received, thereby allowing seamless streaming even during exchange of content sources.

The transceiver 219 is connected to the Internet to perform the following operations. That is, the transceiver 219 transmits a request from the copy requesting unit 211 to the distributed storage 23. In detail, the transceiver 219 transmits a copy requesting message, which is generated by the copy requesting unit 211, to nodes each having one of the storages of the distributed storage 23. Also, in response to the request from the copy requesting unit 211, the transceiver 219 receives the stream of the content copy 24 from the distributed storage 23, and supplies it to the buffer 212. More specifically, the transceiver 219 receives archival fragments of the content copy 24 from at least one of the nodes in the corresponding storages of the distributed storage 23 in response to the copy requesting message from the copy requesting unit 211, and supplies the archival fragments to the buffer 212.

Also, the transceiver 219 transmits a request from the original content requesting unit 217 to the media server 26. More specifically, the transceiver 219 transmits an original content 27 requesting message generated by the original content 27 requesting unit 217 to the media server 26. Also, the transceiver 219 receives a stream of the original content 27 from the media server 26 in response to the request from the original content requesting unit 217, and supplies it to the buffer 212. More specifically, the transceiver 219 receives the stream of the original content 27 in response to the original content requesting message from the original content requesting unit 217, and supplies it to the buffer 212.

Also, the transceiver 219 transmits a request from the power control requesting unit 215 to the home gateway 29. In detail, the transceiver 219 transmits a power control response message generated by the power control requesting unit 215 to the home gateway 29. Also, the transceiver 219 receives a response to the request from the power control requesting unit 215 and transmits it to the estimator 216. In detail, the transceiver 219 receives the power control response message indicating that the media server 26 is powered on from the home gateway 29 in response to the power control response message generated by the power control requesting unit 215, and supplies it to the estimator 216.

Figure 6:
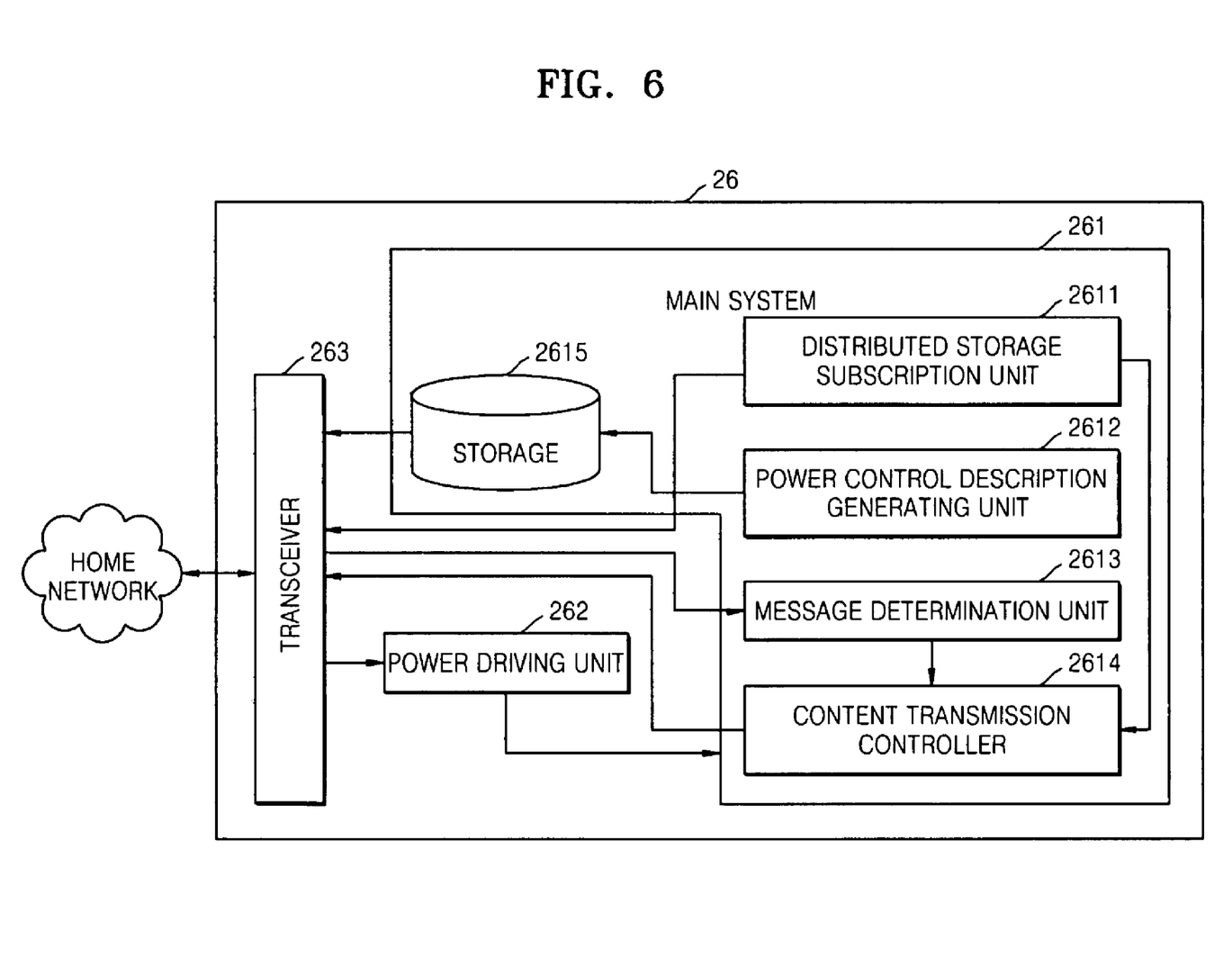
FIG. 6 is a block diagram of an apparatus for transmitting content according to an exemplary embodiment of the present invention.

FIG. 6 is a block diagram of an apparatus for transmitting content temporarily held in the media server 26 according to an exemplary embodiment of the present invention. Referring to FIG. 6, the apparatus includes a main system 261, a power driving unit 262, and a transceiver 263. Also, the main system 261 includes a distributed storage subscription unit 2611, a power control description generating unit 2612, a message determination unit 2613, a content transmission controller 2614, and a storage 2615. In particular, the content stored in the media server 26 is the original content 27. Therefore, the content will now just be referred to as content 27.

The distributed storage subscription unit 2611 makes a subscription to the distributed storage 23 by generating a message requesting a subscription to the distributed storage 23, supplying the message to the transceiver 263, and checking that a response to the message indicates that the subscription to the distributed storage 23 has been completed. If the distributed storage 23 is subject to DHT, the distributed storage subscription unit 2611 can make a subscription to the distributed storage 23 by transmitting a Join(node) API.

The power control description generating unit 2612 generates the power control description 281 describing particulars needed to control the power in the media server 26. As described above, the power control description 281 describes the address of the home gateway 29 that provides a service for controlling power in the media server 26, identification information of the media server 26, command code for controlling the power in the media server 26, etc.

The message determination unit 2613 determines if the message supplied to the transceiver 263 is the original content requesting message that is requested by the user terminal 21 to acquire the content copy 24 from the distributed storage 26 to transmit the original content 27.

The content transmission controller 2614 controls content transmission of the transceiver 263 according to the subscription result of the distributed storage subscription unit 2611 or the determination result of the message determination unit 2613. More specifically, when the distributed storage subscription unit 2611 completes a subscription to the distributed storage 23, the content transmission controller 2614 instructs the transceiver 263 to transmit the original content 27 to the distributed storage 23. Also, when the message determination unit 2613 determines that the message supplied to the transceiver 263 is the original content requesting message, the content transmission controller 2614 instructs the transceiver 263 to transmit the content 27 to the user terminal 21.

The storage 2615 stores the original content 27, and the power control description 281 generated by the power control description generating unit 2612. In particular, the storage 2615 acts as a storage constituting the distributed storage 23 when the distributed storage subscription unit 2611 joins the distributed storage 23.

The main system 261, which includes the distributed storage subscription unit 2611, the power control description generation unit 2612, the message determination unit 2613, the content transmission controller 2614, and the storage 2615, operates when a user powers on the media server 36. In contrast, the power driving unit 262 and the transceiver 263, which will later be described in detail, are always in the active mode.

The power driving unit 262 powers off the main system 261 after transmission by the transceiver 263 and other processes so that it can enter a standby mode to receive a power control command from the home gateway 29. Also, if a message supplied to the transceiver 263 is a power driving message instructing the media server 26 to be powered on, the power driving unit 262 supplies power to the main system 261 to power on the media server 26. As described above, the power driving message instructs the home gateway 29 to receive a request to power on the media server 26 from the user terminal 21 having acquired the power control description 281 to power on the media server 26. A magic packet may be used as the power driving message.

The transceiver 263 is connected to a home network to perform the following transmitting/receiving operations. That is, the transceiver 263 transmits the content 27 stored in the storage 2615 under the control of the content transmission controller 2614. More specifically, the transceiver 263 transmits the content 27 to the distributed storage 23 or the user terminal 21 according to an instruction given from the content transmission controller 2614. In particular, the power control description 281 stored in the storage 2615 is transmitted together when the transceiver 263 transmits the original content 27 to the distributed storage 23.

The power control description 281 may be stored in all or some of the storages of the distributed storage 28, which must be considered when designing the distributed storage 23 so that the user terminal 21 can smoothly acquire the power control description 281 while effectively utilizing the resources in the distributed storage 28.

Figure 7:
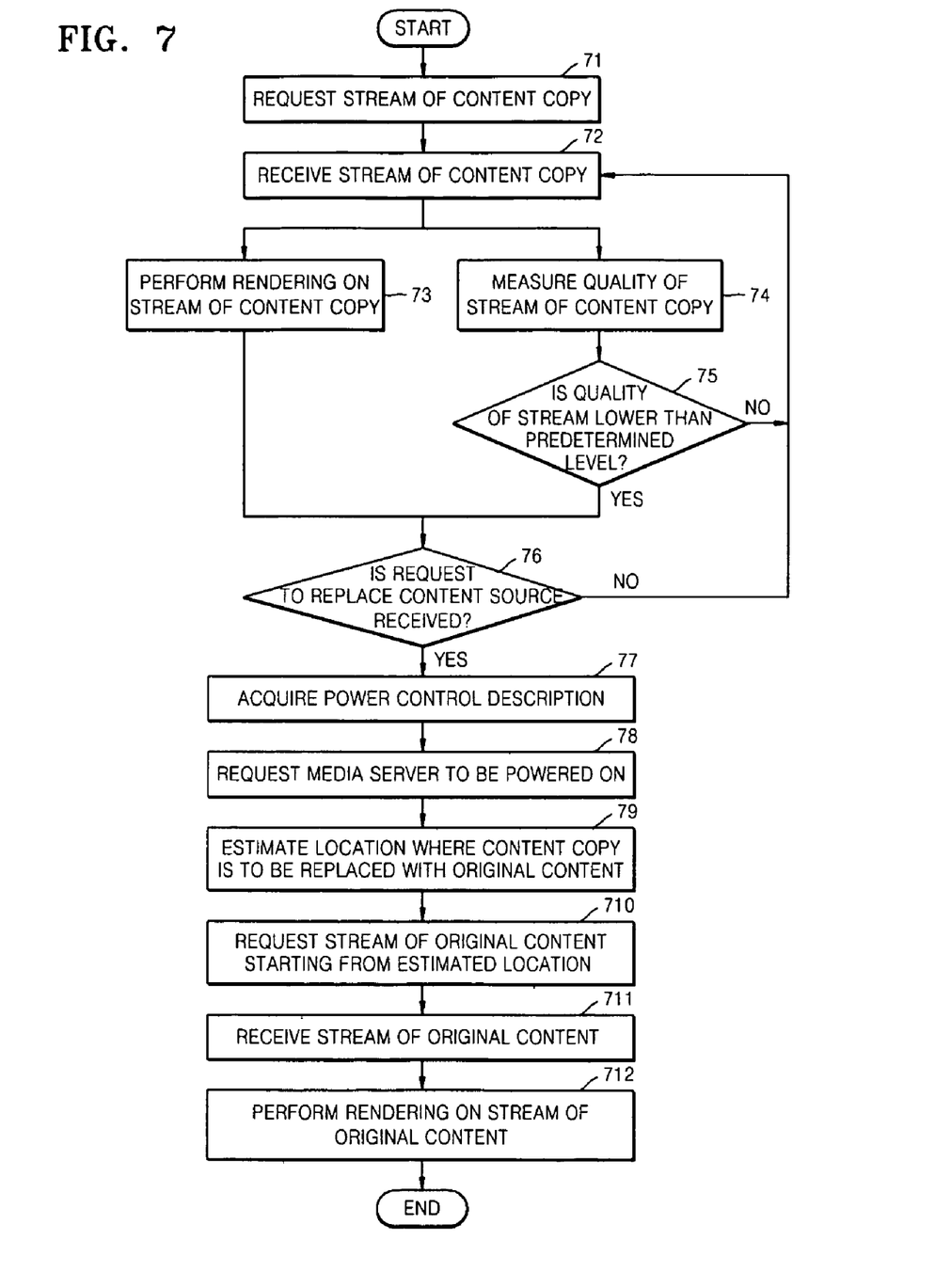
FIG. 7 is a flowchart illustrating a method of receiving a content stream according to an exemplary embodiment of the present invention.

FIG. 7 is a flowchart illustrating a method of receiving a stream of content according to an exemplary embodiment of the present invention. Referring to FIG. 7, the method includes operations performed by the apparatus, illustrated in FIG. 3, which receives a stream of content, according to time, the apparatus being built in the user terminal 21. Therefore, although not described here, the above description of the apparatus of FIG. 3 is also applied to the method of FIG. 7.

Referring to FIG. 7, in operation 71, the user terminal 21 requests the distributed storage 23 to provide a stream of the content copy 24.

In operation 72, the user terminal 21 receives the stream of the content copy 24 from the distributed storage 23 as a response to the request made in operation 71.

In operation 73, the user terminal 21 performs rendering on the stream of the content copy 24 received in operation 72, and supplies the rendering result to the user.

In operation 74, the user terminal 21 measures the quality of the stream of the content copy 24 received in operation 72.

In operation 75, if the quality of the stream of the content copy 24, which is measured in operation 73, is lower than a predetermined level, the user terminal 21 performs operation 76. If not, the user terminal 21 returns to operation 72.

In operation 76, if the user terminal 21 receives a request to replace a source of a content stream (the content copy 24) with the original content 27 from the user who recognizes that the quality of the stream of the content copy 24 is lower than the predetermined level, the user terminal 21 performs operation 77. If not, the user terminal 21 returns to operation 72.

In operation 77, the user terminal 21 acquires a power control description describing particulars needed to control power in the media server 26 from meta data contained in the content copy 24. Alternatively, in operation 77, the user terminal 21 may acquire the power control description 281 not in response to the request from the user when the quality of the stream of the content copy 24 measured in operation 74 is lower than the predetermined level.

In operation 78, the user terminal 21 requests the media server 26 storing the original content 27 to be powered on, based on the power control description 281 obtained in operation 77.

In operation 79, the user terminal 21 estimates a location where the content copy 24 is to be replaced with the original content 27, in consideration of the communication environment between the user terminal 21 and the media server 26 that is powered on in response to the request made in operation 78.

In operation 710, the user terminal 21 requests the media server 26, which is powered on in response to the request made in operation 78, to provide a stream of the original content 27 starting from the location estimated in operation 79.

In operation 711, the user terminal 21 receives the stream of the original content 27 from the media server 26, which is provided in response to the request made in operation 710.

In operation 712, the user terminal 21 performs rendering on the stream of the original content 27 received in operation 711, and supplies the rendering result to the user.

Figure 8:
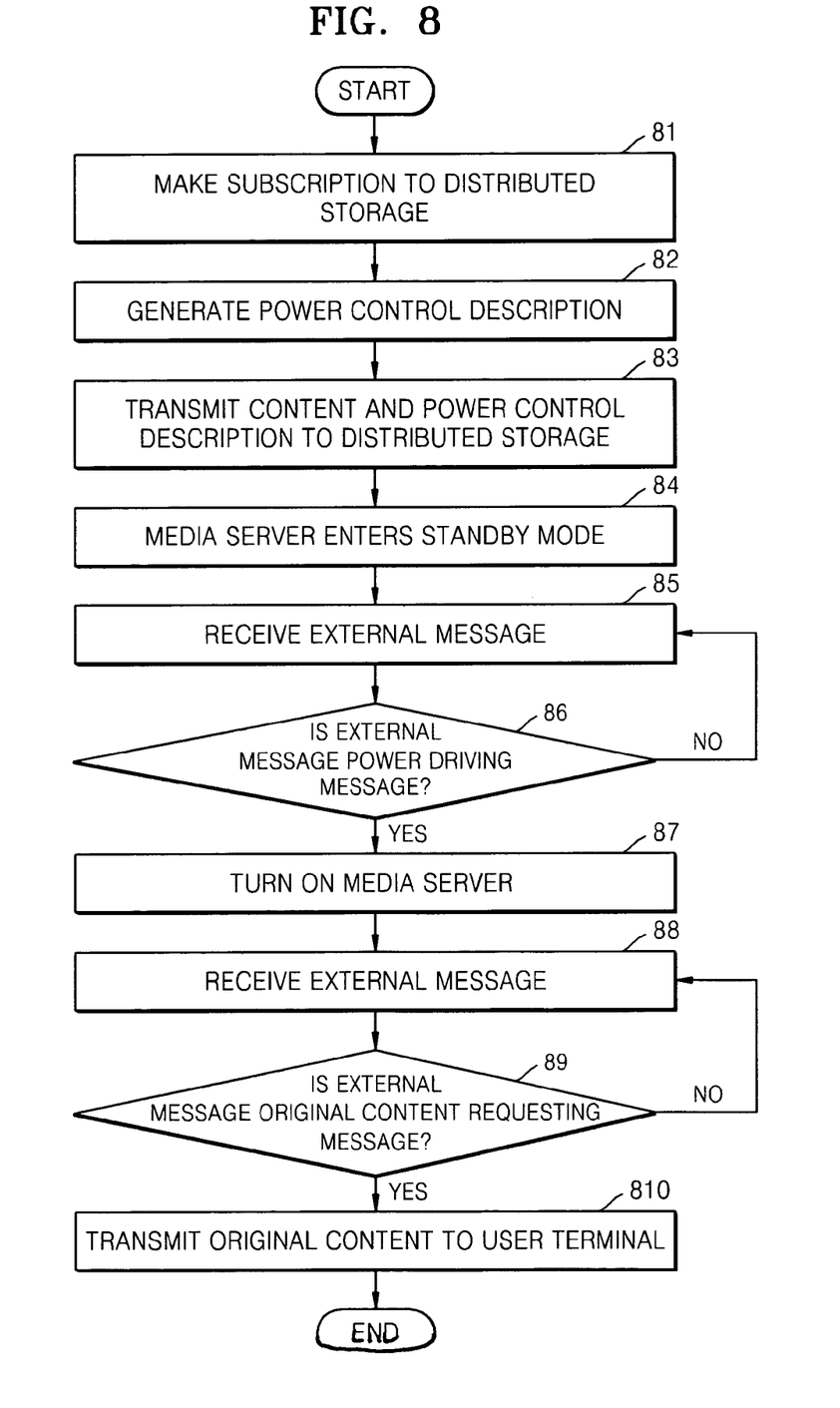
FIG. 8 is a flowchart illustrating a method of transmitting content according to an exemplary embodiment of the present invention.

FIG. 8 is a flowchart illustrating a method of transmitting content according to an exemplary embodiment of the present invention. Referring to FIG. 8, the method includes operations performed by the apparatus, illustrated in FIG. 6, which transmits content temporarily held in the media server 26, according to time. Thus, although not described here, the above description of the apparatus of FIG. 6 is also applied to the method of FIG. 8.

Referring to FIG. 8, in operation 81, the media server 26 makes a subscription to the distributed storage 23.

In operation 82, the media server 26 generates the power control description 281 describing particulars needed to control power in the media server 26.

In operation 83, if the subscription of the media server 26 to the distributed storage 23 in operation 81 is completed, the media server 26 transmits the content 27, and the power control description 281 generated in operation 81 to the distributed storage 23.

In operation 84, the media server 26 powers off the main system 261 after the transmission in operation 83 and other operations in order to enter a standby mode in which the media server 26 can receive a power control command from the home gateway 29.

In operation 85, the media server 26 receives an external message in the standby mode that it entered in operation 84.

In operation 86, if the external message received in operation 85 is a power driving message that instructs the media server to be powered on, the media server 26 performs operation 87. If not so, the media server 26 returns to operation 85.

In operation 87, the media server 26 supplies power to the main system 261 in order to power on the media server 26.

In operation 88, the media server 26 receives an external message while the media server 26 is powered on.

In operation 89, the media server 26 determines whether the external message received in operation 88 is an original content requesting message that the user terminal 21, having acquired the content copy 24 from the distributed storage 26, requests transmission of the original content 27. If the external message received in operation 88 is the original content requesting message operation 810 is performed, if not, the method returns to operation 88.

In operation 810, the media server 26 transmits the original content 27 to the user terminal 21.

The above exemplary embodiments of the present invention can be embodied as a computer readable program and realized in a general digital computer that executes the program via a computer readable medium. Also, the data structures used in the above embodiments can be recorded in a computer readable medium via various devices.

Examples of the computer readable medium include a magnetic storage medium (a ROM, a floppy disk, a hard disc, etc.), an optical storage medium (a CD-ROM, a DVD, etc.), and carrier waves (such as in transmission over the Internet).

According to an exemplary embodiment of the present invention, a stream of the original content is selectively received according to the quality of a copy of content received from a distributed storage. Therefore, it is possible to prevent degradation in the quality and reliability of content, and stably receive a high-quality content streaming service even when receiving archival fragments of the copy of the content from the distributed storage. That is, the present invention employs the advantages of a method of acquiring a content copy from the distributed storage and a method of acquiring the original content from a media server. In detail, the former method is advantageous in that the accessibility and usability of content are high, and the latter method is advantageous in that the quality of content streaming is uniform and the reliability thereof is high.

According to an exemplary embodiment of the present invention, a power control description describing particulars needed to control power in the media server is obtained from meta data contained in a copy of content. Therefore, even if a method of controlling power in the media server is not provided to a user terminal, the user terminal is capable of powering on the media server and replacing a source of a stream of content. Also, according to an exemplary embodiment of the present invention, until the media server is powered on and the stream of the content can be received from the media server, a stream of the copy of the content is received, thereby enabling seamless content streaming even during replacement of the source of the stream of the content.

In particular, the present invention is very helpful in the following cases. First, when the number of archival fragments of a copy of content received from the distributed storage are very low, a source of a stream of the content (the content copy) is replaced with the original content stored in the media server, thereby increasing the quality of content streaming. Second, when some of the archival fragments of the copy of the content received from the distributed storage are lost, the source of the stream of the content is also replaced with the original content stored in the media server, thereby completing content streaming. Third, when the copy of the content received from the distributed storage is completely received but the quality thereof is very low, the source of the stream of the content is also replaced with the original content stored in the media server, thereby increasing the quality of content streaming.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. A method of receiving a stream of content, the method comprising:
    (a) receiving a plurality of archival fragments of a stream of a copy of content from a plurality of storages distributed in a network, wherein an original of the content is stored in a server and the archival fragments of the copy of the content are separately stored in the storages;
    (b) determining a number of the archival fragments received in the operation (a);
    (c) determining a quality of the received stream of the copy based on the number of the received archival fragments; and
    (d) receiving a stream of the original of the content from the server if the quality of the received stream of the copy is lower than a level.

2. The method of claim 1, wherein in the operation (a), the receiving of the stream of the copy comprises receiving the archival fragments of the copy from at least one of a plurality of nodes which include the storages.

3. The method of claim 1, further comprising (e) requesting the stream of the original of the content if the quality of the received stream of the copy before the operation (d), is lower than the level,
    wherein during in the operation (d), the stream of the original of the content is received as a response to the request made in the operation (e).

4. The method of claim 3, further comprising (f), if the quality of the received steam of the copy is lower than the level, requesting the server storing the original of the content to be powered on,
    wherein in the operation (e), the server being powered on in response to the request made in the operation (f) is requested to provide the stream of the original of the content.

5. The method of claim 4, further comprising obtaining a description describing particulars needed to control power in the server from meta data contained in the copy,
    wherein in the operation (f), the powering on of the server is requested based on the obtained description.

6. The method of claim 3, further comprising estimating a location of the original of the content where the copy is replaced with the original of the content in consideration of a communication environment between a user terminal and the server that is powered on in response to the request,
    wherein in the operation (e), providing of the stream of the original of the content starting from the estimated location is requested.

7. An apparatus for receiving a stream of content, the apparatus comprising:
    a receiver which receives a plurality of archival fragments of a stream of a copy of content from a plurality of storages distributed in a network, wherein an original of the content is stored in a server and the archival fragments of the copy of the content are separately stored in the storages;
    a first determining unit which determines a number of the archival fragments received by the receiver;
    a second determining unit which determines a quality of the received stream of the copy based on the number of the received archival fragments; and
    a first requesting unit which requests a stream of the original of the content from the server if the quality of the received stream of the copy is lower than a level,
    wherein the receiver receives the stream of the original of the content provided in response to the request from the first requesting unit.

8. The apparatus of claim 7, further comprising a second requesting unit which requests the server storing the original of the content to be powered on when the quality of the stream of the content, which the receiver receives, is lower than the level,
    wherein the first requesting unit requests the server, which is powered on in response to the request from the second requesting unit, to provide the stream of the original of the content.

9. A computer readable medium having recorded thereon a computer program for a method of receiving a stream of content, the method comprising:
    receiving a plurality of archival fragments of a stream of a copy of content from a plurality of storages distributed in a network, wherein an original of the content is stored in a server and the archival fragments of the copy of the content are separately stored in the storages;
    determining a number of the received archival fragments;
    determining a quality of the received stream of the copy based on the number of the received archival fragments; and
    receiving a stream of the original of the content if the quality of the received stream of the copy is lower than a level.

10. A method of transmitting content, the method comprising:

(a) transmitting a plurality of archival fragments of a copy of content to a plurality of storages distributed in a network, wherein an original of the content is stored in a server and the archival fragments of the copy of the content are separately stored in the storages; and (b) transmitting the content to a terminal acquiring the plurality of archival fragments of the copy of the content from the storages, in response to a request from the terminal, wherein the request is transmitted from the terminal if a quality of the acquired copy is lower than a level, wherein a number of the archival fragments of the copy acquired in the terminal is determined by the terminal and the quality is determined based on the number of the archival fragments of the copy acquired in the terminal.

11. The method of claim 10, further comprising determining whether an external message is a first message in which the terminal requests the original of the content, wherein in the operation (b), if the external message is the first message, the content is transmitted to the terminal.

12. The method of claim 10, further comprising powering on the server which performs the method if the external message is a second message that instructs the server to be powered on, wherein in the operation (b), the powered-on server transmits the content to the terminal.

13. The method of claim 12, further comprising generating a power control description describing particulars needed to control power in the server, wherein in the operation (a), the content and the power control description are transmitted, and the second message instructs a home gateway to power on the server, the home gateway receiving a request to power on the server from the terminal having acquired the power control description.

14. An apparatus for transmitting content, the apparatus comprising:

a transmitter which transmits a plurality of archival fragments of a copy of content to a plurality of storages being distributed in a network, wherein an original of the content is stored in a server and the archival fragments of the copy of the content are separately stored in the storages; and a determination unit which determines whether an external message is a first message in which a terminal, having acquired the plurality of archival fragments of the copy of the content from the storages, requests the original of the content, wherein the first message is transmitted from the terminal if a quality of the acquired copy is lower than a level, wherein a number of the archival fragments of the copy acquired in the terminal is determined by the terminal and the quality is determined based on the number of the archival fragments acquired in the terminal, wherein the transmitter transmits the content to the terminal if the external message is determined to be the first message.

15. The apparatus of claim 14, further comprising a power driving unit which powers on the server having the apparatus, if the determination unit determines that the external message is a second message, which instructs the server to be powered on, wherein the transmitter transmits the content to the server being powered on by the power driving unit.

16. A computer readable medium having recorded thereon a computer program for a method of transmitting content, the method comprising:

transmitting a plurality of archival fragments of a copy of content to a plurality of storages distributed in a network, wherein an original of the content is stored in a server and the archival fragments of the copy of the content are separately stored in the storages; and transmitting the content to a terminal acquiring the plurality of archival fragments of the copy of the content from the storages, in response to a request from the terminal, wherein the request is transmitted from the terminal if a quality of the acquired copy is lower than a level, wherein a number of the archival fragments of the copy acquired in the terminal is determined by the terminal and the quality is determined based on the number of the acquired archival fragments.

* * * * *